United States Patent [19]

Olney et al.

[11] 3,895,481

[45] July 22, 1975

[54] LAWN MOWERS

[75] Inventors: Norman Seth Olney; Timothy Dickinson, both of Stowmarket, England

[73] Assignee: Suffolk Lawn Mowers Limited, Suffolk, England

[22] Filed: Dec. 6, 1973

[21] Appl. No.: 422,351

[30] Foreign Application Priority Data
Dec. 11, 1972  United Kingdom............... 57000/72

[52] U.S. Cl. ...................... 56/17.5; 56/199; 56/249
[51] Int. Cl. ........................................... A01d 55/20
[58] Field of Search ............. 56/249, 256, 202, 199, 56/17.5, 10.5

[56] References Cited
UNITED STATES PATENTS

| | | | |
|---|---|---|---|
| 2,433,126 | 12/1947 | Kersey | 56/249 |
| 2,651,904 | 9/1953 | Jatunn | 56/249 |
| 3,100,372 | 8/1963 | Barth | 56/249 X |
| 3,627,054 | 12/1971 | Lay | 56/256 X |
| 3,696,593 | 10/1972 | Thorud et al. | 56/17.5 |

*Primary Examiner*—Louis G. Mancene
*Assistant Examiner*—J. N. Eskovitz
*Attorney, Agent, or Firm*—Fitch, Even, Tabin & Luedeka

[57] ABSTRACT

A mains electric cylinder lawn mower wherein the side plates are of electrically insulating plastics material and the other major structural components of the lawn mower are of metal and are mounted to the side plates at spaced apart points, so as electrically to isolate them from one another. Such components include a shaped sheet metal deck spanning the sides plates, giving strength and denying access to the cutting cylinder from above, and spaced apart metal tie rods. A box structure on the deck houses the motor. The mower discharges cut grass rearwardly into a plastics grass box hung from and shielding the lower portion of the metal handle by means of a peripheral flange on the box.

9 Claims, 3 Drawing Figures

LAWN MOWERS

This invention relates to lawn mowers powered by electric motors.

The use of mains electricity to power a lawn mower has now become accepted but at the same time the risks involved must be realistically assessed. In spite of warning notices, the ordinary user is not wholly unlikely to neglect routine maintenance, and may for example use the lawn mower to cut long wet grass and then attempt to free a jammed cutter blade with his fingers before switching off. This sort of combination of events can under some circumstances lead to severe electric shocks.

A general object of this invention is to provide an electric motor powered lawn mower of increased electrical safety, compared with electric lawn mowers presently available.

According to the present invention there is provided a lawn mower comprising an electric motor arranged to drive a cutting cylinder, said cylinder being rotatably mounted by means of a pair of lawn mower side plates formed of electrically insulating plastics material and a bottom blade in cutting relationship with said cylinder, said bottom blade being mounted to said side plates.

It has been found according to this invention that the provision of side plates of electrically insulating material is a key step in rendering mains electric cylinder lawn mowers electrically more safe. The other major components of the lawn mower, and particularly those that need to be of metal, can then each be mounted to the side plates at spaced apart points and thus all be electrically isolated from one another.

A substantially continuous metal deck is preferably provided spanning the two side plates above the cylinder and extending substantially to the forward and rear ends of the plates. This deck serves to provide strength and also serves to deny access to the cutting cylinder from above. This is a further safety feature.

The deck is preferably provided with a metal box structure on its upper side, the combination of a shaped metal deck and the box structure giving substantial structural strength including resistance to bending about three mutually perpendicular axes and thus torsional rigidity.

The box structure conveniently serves as a housing for said electric motor.

The lawn mower handle is preferably of tubular metal and is secured to the side plates at points spaced from any other conductive member of the lawn mower that is secured to said side plates, thereby electrically isolating the handle from any conductive part of the structural frame of the lawn mower.

The lawn mower is preferably arranged to discharge cut grass rearwardly, and a grass collection box, suitably of electrically insulating plastics material, is preferably provided hung from the lawn mower handle. The handle may comprise a lower inverted U-shaped handle portion and an upper handle portion adjustably secured to said lower portion. The grass box may then be provided with a peripheral flange to rest over said U-shaped handle portion to provide a convenient and secure support for the grass box as well as to shield the handle from possible bridging by wet grass discharged from the lawn mower cutting cylinder.

An embodiment of the invention will now be described, by way of example, with reference to the accompanying drawings, in which.

Figure 1:
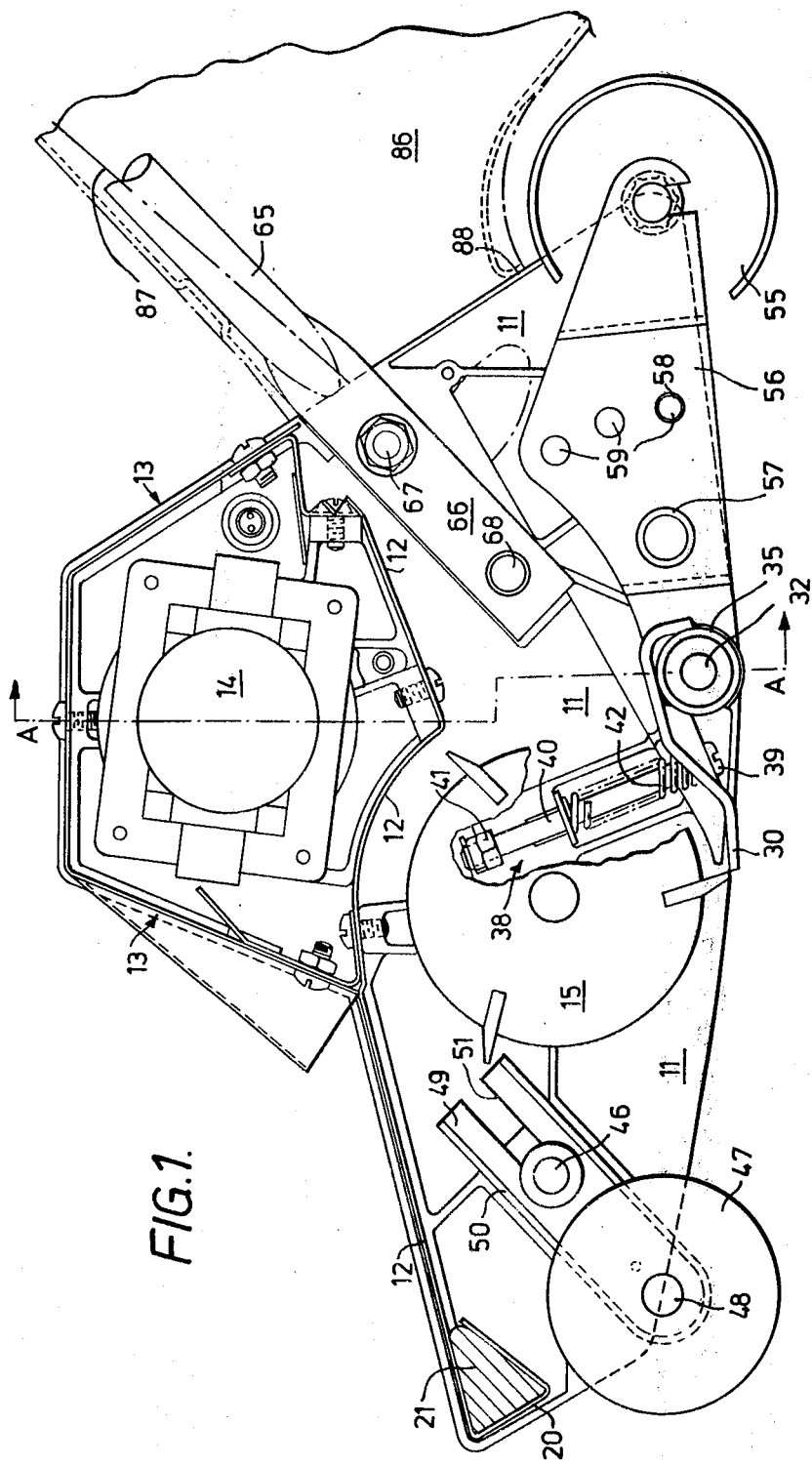
FIG. 1 is a side elevation, with one side plate removed, of a lawn mower according to the invention.

Referring to the drawings, the structural frame of the illustrated lawn mower comprises two side plates 10, 11 of electrically insulating plastics material; preferably of a glass-filled Nylon. A sheet metal deck 12 spans the side plates and is substantially continuous from side to side of the mower body and front to back of the side plates. The deck is provided with a metal box structure 13 and it will be appreciated that the shaping of the deck and box structure as shown in FIG. 1 provides substantial strength including resistance to bending about all axes. The box 13 serves to house a mains electric motor 14. The structural frame also includes the rods as described below.

A three-bladed cutting cylinder 15 is rotatably mounted between the side plates by means of bearings 16 and 17. The cylinder is driven from the motor 14 by a toothed rubber belt (not shown) working between plastics material pulleys 18 and 19.

The forward edge of the deck 12 is folded under, for strength, as shown at 20. This folded under portion 20 shrouds the cylinder from the front just as the remainder of the deck shrouds the cylinder from above. As will be appreciated from FIG. 1, it is effectively impossible for an operator to get his fingers in or even very near the cutting cylinder from above or from the front or rear of the mower. The horizontal distance from the edges of the deck to the cylinder is preferably substantially longer than the average forefinger. The portion 20 may also retain a weight 21 which may be needed on smaller models, in view of the overall lightness resulting from extensive use of plastics material.

Figure 2:
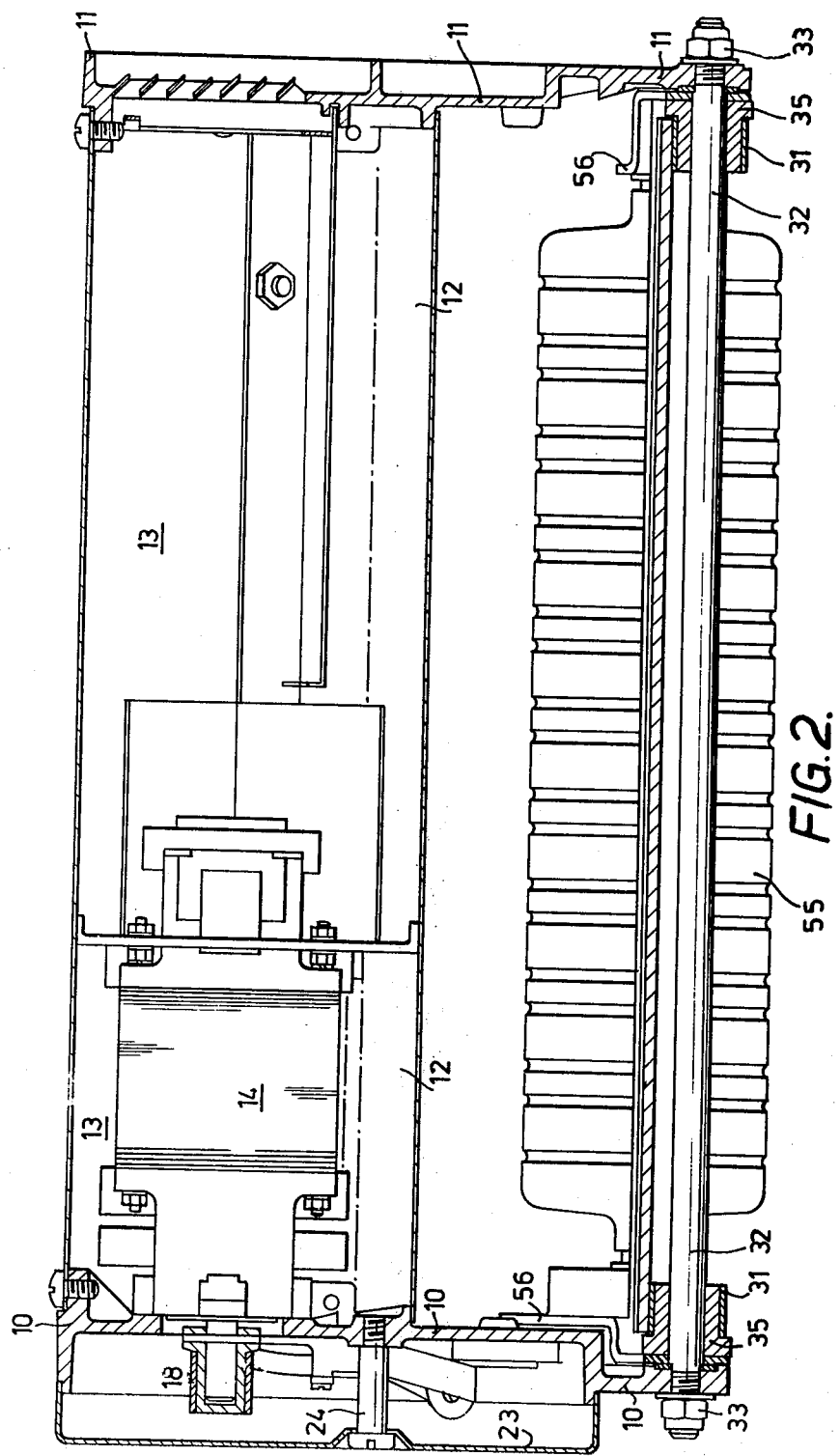
FIG. 2 is a vertical section through the lawn mower on line A—A of FIG. 1.
Figure 3:
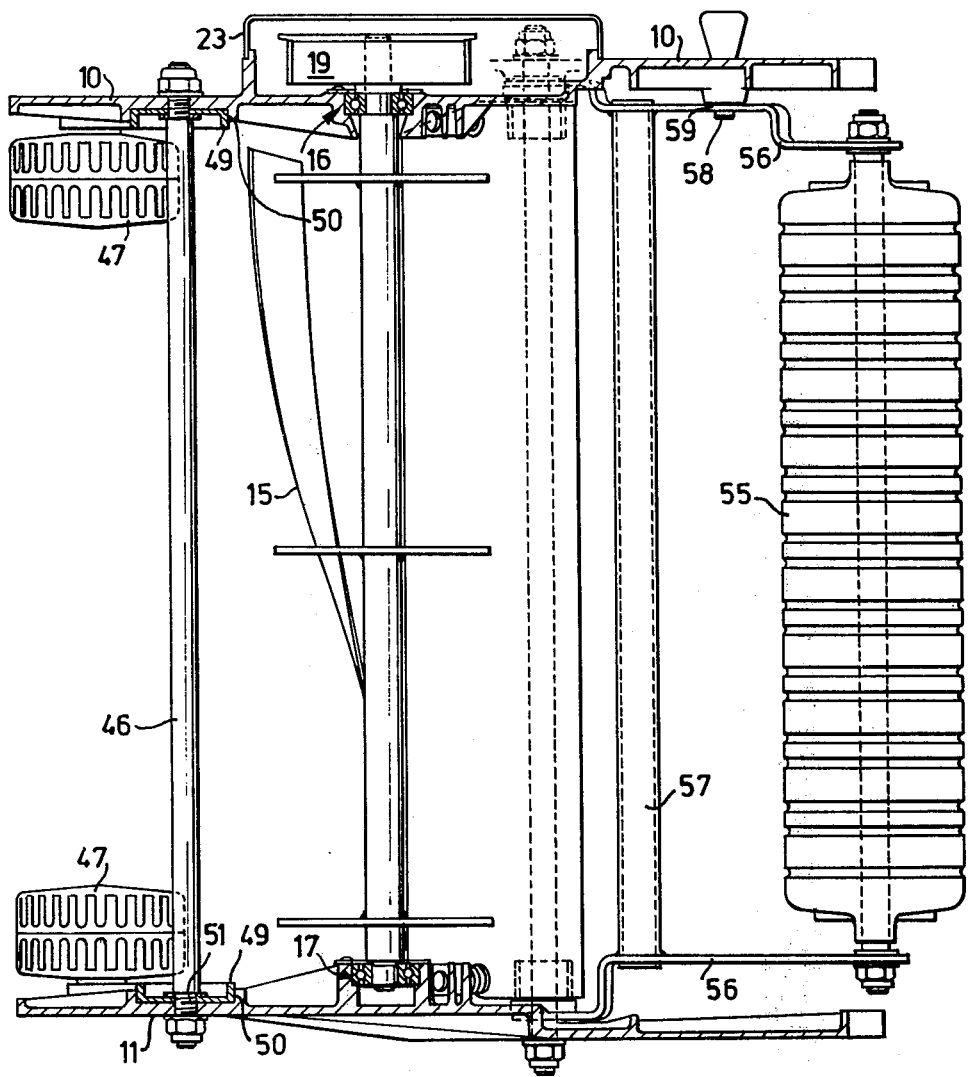
FIG. 3 is an underneath plan view of the lawn mower.

Referring to FIG. 3 the pulley 19 on the cylinder shaft, and the pulley 18 and drive belt, are shrouded by a metal cover plate 23 secured by bolt 24 (FIG. 2) to the side plate 10, both plate 23 and bolt 24 being out of contact with any component of the power other than the insulating side plates 10. The other end of the cylinder shaft and bearings 17 are disposed wholly on the inner side of the other side plate 11, as shown in FIG. 3, and are thus inaccessible except from beneath the lawn mower.

A bottom blade 30 is disposed in cutting relationship with cylinder 15. The blade is welded to a metal sleeve 31 which rotates about a structural metal tie rod 32 extending between the two side plates to tie the side plates together. The tie rod 32 has locked nuts 33 exposed on the outside of the side plates. Consequently the sleeves 31 are isolated from 32 by means of plastics material bushes 35 plugged in the ends of sleeves 31 as shown in FIG. 2. The illustrated bottom blade is of metal though the use of certain insulating plastics material is not excluded as a practical possibility in the future. The blade is, of course, in continual contact with at least one of the cutting cylinder blades and it will be appreciated that the described arrangement also denies access to the bottom blade except from underneath the mower.

The bottom blade is provided with adjusting mechanisms shown generally at 38. Mechanisms 38 are disposed wholly on the inner side of the respective side plates and the adjustment of blade position is effected from underneath the mower by turning head 39 of bolt 40 with a screwdriver. Bolt 40 works in stationary bolt 41 and appropriate rotation of bolt 40 thus urges the bottom blade upwardly against the action of a compression spring 42. It will be seen that the mechanisms 38 are not in contact with any other conductive part of the mower except the bottom blade which in turn contacts the cylinder. All these last mentioned components are only accessible from underneath the mower. As can be seen in FIGS. 1 and 3, the stationary nuts 41 are each captured in an extension of a boss which is moulded as part of (or it could be attached to) the side plate and which houses the bearings 16 and 17. Thus the fixed abutment for each mechanism 38 is close to the cylinder bearing, so reducing the length of the load path between the cutting cylinder and the bottom blade back via mechanisms 38 to the cylinder bearings.

The side plates 10, 11 are also tied together by a forward end structural tie rod 46, again isolated from any other previously mentioned conductive components secured to the side plates. The mower is provided with front wheels 47 of plastics material or alternatively a roller may be used. The wheels are carried on stub shafts 48 projecting from slide pieces 49 which can slide for adjustment purposes in angle guides 50 moulded integrally with the side plates. The tie rod 46 extends through open-ended slots 51 in the slide pieces.

The lawn mower is provided with a plastics material rear roller 55 carried on lever arm 56 as best seen in FIG. 3. The lever arms pivot about the bottom blade tie rod 32 but, as seen in FIG. 2, are isolated from the bottom blade securing sleeves 31 by means of the bushes 35. The lever arms 56 are secured together by a tie tube 57, and one lever arm is provided with a cutting height adjustment device in the form of a manually operable spring loaded stop peg 58 capable of limited withdrawal and reinsertion in each of three spaced bores 59 in the one lever arm 56.

The lawn mower handle is formed of tubular metal preferably provided with a plastics material coating or paoint. The handle comprises a lower inverted U-shaped portion 65 and an upper inverted U-shaped portion (not shown) adjustably and pivotally secured to said lower portion. The upper portion carries the control switches (not shown) for the mower and is pivotable right over the mower body so that the switches at its upper end rest on the forward portion of the deck. This results in a convenient compact article for packaging and general stowage.

The lower handle portion 65 has flattened ends 66 bolted to the side plates 10, 11 by bolts 67, 68 at points well spaced apart from electrical contact with any other previously mentioned conductive component of the lawn mower secured to said side plates. The upper boundary of the discharge path of the cut grass for the cutting cylinder is substantially the plane of the handle portion 65. A grass box (a fragment only is shown at 86) of electrically insulating plastics material is hung from and located by the handle portion 65. The grass box has side edge flanges 87 which curl over the uprights of handle 65 and thus shield the uprights of handle portion 65 from bridging by discharged wet grass. The box also has an upper rear flange which rests over the base of the U of portion 65. The lower forward edge 88 of the grass box rests against the side plates 10, 11.

A further plastics material member spans the upper rear portion of the grass box and extends upwardly of the plane of handle 65. This provides a handle for lifting the box out of its located position hung on portion 65, and in addition provides a grass shield to prevent grass from overshooting the grass box 86.

We claim:

1. A lawn mower comprising a structural frame and an operating handle, said structural frame including a pair of spaced apart side plates formed of electrically insulating plastics material and a plurality of structural metal components extending transverse to said side plates, securing means securing each said metal component to each said side plate at a point spaced apart from the securing points of other of said structural metal components, further securing means securing said operating handle to each said side plate at a point spaced from said metal components securing points, a metal cutting cylinder, bearing means secured to said side plates and rotatably mounting said cutting cylinder, a metal bottom blade in cutting relationship with said cutting cylinder, means mounting said bottom blade to said side plates, and said cutting cylinder and said bottom blade being spaced apart from said handle and from said structural metal components, whereby said structural metal components and said handle are all electrically isolated from one another, and whereby said cylinder and said bottom blade are electrically isolated from said structural metal components and from said handle.

2. A lawn mower according to claim 1 wherein at least one of said structural metal components is of sheet metal shaped to give resistance to bending and torsional deformation at least about certain axes, and at least one further said structural metal component is a metal tie rod.

3. A lawn mower according to claim 1 wherein one of said structural metal components is a substantially continuous sheet metal deck, said deck spanning said two side plates above said cylinder and extending substantially to the forward and rearward ends of said side plates.

4. A lawn mower according to claim 3 including a metal box structure of sheet metal, means securing said box structure to the upper side of said deck, said box structure extending between said side plates, and means securing said box structure to said side plates.

5. A lawn mower according to claim 4 wherein said electric motor is housed within said metal box structure, and said drive transmitting means includes an electrically insulating transmission component electrically to isolate the motor from the cutting cylinder.

6. A lawn mower according to claim 1 wherein the lawn mower is arranged to discharge cut grass rearwardly and a grass collection box is provided hung from said operating handle.

7. A lawn mower according to claim 6 wherein the grass collection box is of electrically insulating plastics material and is formed with a peripheral flange, said flange being supported by the lower portion of said handle and shielding at least said lower portion of said handle from cut grass discharged by said mower.

8. A lawn mower according to claim 7 wherein the grass collection box includes a sheet plastics material member spanning the upper rear portion of the grass collection box and extending upwardly and forwardly of the plane of the handle, whereby to provide both a lifting handle for the box and a grass shield for overshooting cut grass.

9. A lawn mower according to claim 1 including adjusting means for adjusting the position of the bottom blade, said adjusting means being carried on the inner surface of each said plastics material side plate and operable only from beneath the mower.

* * * * *

UNITED STATES PATENT AND TRADEMARK OFFICE
CERTIFICATE OF CORRECTION

PATENT NO. : 3,895,481
DATED : July 22, 1975
INVENTOR(S) : Norman Seth Olney and Timothy Dickinson It is certified that error appears in the above-identified patent and that said Letters Patent are hereby corrected as shown below:

IN THE ABSTRACT

Line 7, "sides plates" should be -- side plates -- .

IN THE SPECIFICATION

Column 2, line 44, "power" should be -- mower -- .

Signed and Sealed this twenty-fifth Day of November 1975

[SEAL]

Attest:

RUTH C. MASON
Attesting Officer

C. MARSHALL DANN
Commissioner of Patents and Trademarks